(12) United States Patent
Shinozaki et al.

(10) Patent No.: US 9,966,608 B2
(45) Date of Patent: May 8, 2018

(54) ELECTROLYTIC COPPER FOIL, METHOD OF PRODUCING ELECTROLYTIC COPPER FOIL, LITHIUM ION SECONDARY CELL USING ELECTROLYTIC COPPER FOIL AS COLLECTOR

(75) Inventors: Kensaku Shinozaki, Tokyo (JP); Akitoshi Suzuki, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 77 days.

(21) Appl. No.: 14/129,138

(22) PCT Filed: Jun. 27, 2012

(86) PCT No.: PCT/JP2012/066421
§ 371 (c)(1),
(2), (4) Date: Mar. 5, 2014

(87) PCT Pub. No.: WO2013/002279
PCT Pub. Date: Jan. 3, 2013

(65) Prior Publication Data
US 2014/0199588 A1    Jul. 17, 2014

(30) Foreign Application Priority Data

Jun. 30, 2011  (JP) ................................ 2011-145382

(51) Int. Cl.
*H01M 4/66* (2006.01)
*C25D 1/04* (2006.01)
(Continued)

(52) U.S. Cl.
CPC .............. *H01M 4/667* (2013.01); *C25D 1/04* (2013.01); *C25D 3/38* (2013.01); *H01M 4/0452* (2013.01);
(Continued)

(58) Field of Classification Search
CPC ....................................................... H01M 4/661
(Continued)

(56) References Cited

U.S. PATENT DOCUMENTS

| | | | |
|---|---|---|---|
| 5,431,803 A | 7/1995 | DiFranco et al. | |
| 2001/0042686 A1* | 11/2001 | Taniguchi | C25D 1/04 205/50 |

(Continued)

FOREIGN PATENT DOCUMENTS

| | | | |
|---|---|---|---|
| JP | 2001-123290 A | 5/2001 | |
| JP | 2004-79523 A | 3/2004 | |

(Continued)

OTHER PUBLICATIONS

Interntional Search Report for PCT/JP2012/066421, Japanese Patent Office, dated Oct. 9, 2012.

(Continued)

*Primary Examiner* — Jonathan G Leong
(74) *Attorney, Agent, or Firm* — Kubotera & Associates, LLC

(57) ABSTRACT

The present invention provides an electrodeposited copper foil having a tensile strength of at least 300 MPa and elongation rate of at least 3.0% after heat treatment at 350° C. for 1 hour and provides a copper foil which prevents the breakage of a current collector (copper foil) while maintaining adhesiveness between the current collector (copper foil) and the active material in response to substantial expansion and contraction of a Si or Sn alloy-based active material. The foil is an electrodeposited copper foil having a roughened surface, the tensile strength of the copper foil being at least 300 MPa after heating at 350° C. for 1 hour, the elongation rate being at least 3.0% after heating at 350° C. for 1 hour, and respective surface area ratios (actual surface area/geometric surface area) of both sides of the copper foil (the side that is roughened and the side that is not roughened)

(Continued)

being from 1.6 to 2.2. The electrodeposited copper foil is produced with an electrolyte in which from 3 to 20 ppm of organic additives of one or more compounds selected from compounds having a structure with an SH group binding to a heterocycle containing N or thiourea-based compounds is added to a copper sulfate-based electrolyte, and then from 0 to 12 ppm of hydroxyethyl cellulose or a low-molecular weight glue, and from 10 to 80 ppm of chlorine ions are added thereto.

9 Claims, 1 Drawing Sheet

(51) Int. Cl.
*C25D 3/38* (2006.01)
*H01M 4/134* (2010.01)
*H01M 4/38* (2006.01)
*H01M 4/04* (2006.01)
*H01M 10/052* (2010.01)
*C25D 5/50* (2006.01)

(52) U.S. Cl.
CPC ........... *H01M 4/134* (2013.01); *H01M 4/386* (2013.01); *H01M 4/387* (2013.01); *H01M 4/661* (2013.01); *H01M 10/052* (2013.01); *C25D 5/50* (2013.01)

(58) Field of Classification Search
USPC ...... 429/208, 209, 246, 233; 29/623.1–623.5
See application file for complete search history.

(56) References Cited

U.S. PATENT DOCUMENTS

| | | | |
|---|---|---|---|
| 2004/0104117 A1* | 6/2004 | Yang | C25D 1/04 205/76 |
| 2005/0019599 A1* | 1/2005 | Moteki et al. | 428/626 |
| 2006/0210875 A1* | 9/2006 | Kogetsu et al. | 429/209 |
| 2007/0042212 A1 | 2/2007 | Moteki et al. | |
| 2009/0095515 A1 | 4/2009 | Sakai et al. | |

FOREIGN PATENT DOCUMENTS

| | | |
|---|---|---|
| JP | 2008-101267 A | 5/2008 |
| JP | 2009-221592 A | 10/2009 |
| JP | 2009-299100 A | 12/2009 |
| JP | 4583149 B2 | 11/2010 |
| JP | 2010-282959 A | 12/2010 |
| JP | 2011-174146 A | 9/2011 |
| WO | 2012/091060 A1 | 7/2012 |

OTHER PUBLICATIONS

Office Action issued by SIPO (State Intellectual Property Office of the People's Republic of China) dated Jul. 17, 2015.
Office Action issued by KIPO (Korean Intellectual Property Office) dated Oct. 13, 2015.

* cited by examiner

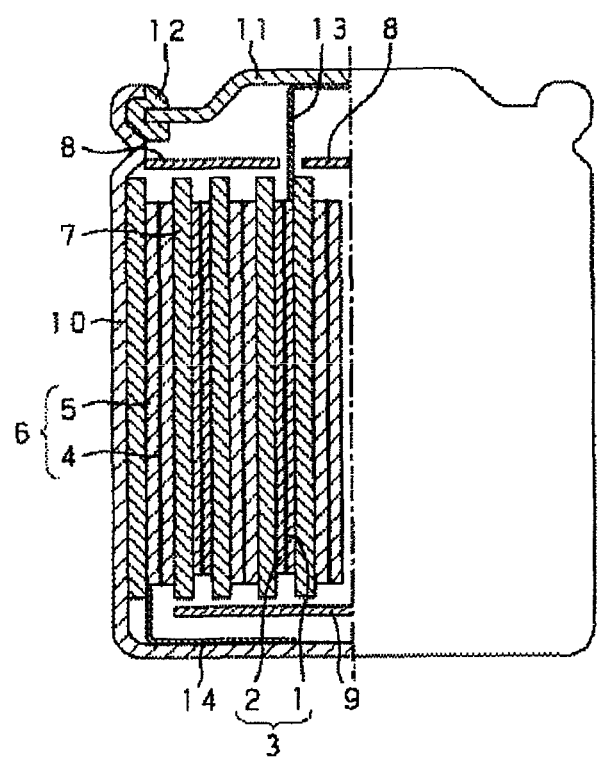

ELECTROLYTIC COPPER FOIL, METHOD OF PRODUCING ELECTROLYTIC COPPER FOIL, LITHIUM ION SECONDARY CELL USING ELECTROLYTIC COPPER FOIL AS COLLECTOR

TECHNICAL FIELD

The present invention relates to a non-aqueous electrolyte secondary battery such as a lithium-ion secondary battery, comprising a positive electrode, a negative electrode with a negative electrode active material layer formed on a surface of a negative electrode current collector, and a non-aqueous electrolyte, and an electrodeposited copper foil particularly excellent for constituting the current collector of the battery negative electrode.

BACKGROUND ART

In recent years, development has been advanced for next-generation negative electrode active materials having a charge and discharge capacity substantially exceeding the theoretical capacity of carbon materials as negative electrode active materials for lithium-ion secondary batteries. For example, materials containing metals capable of forming alloys with lithium (Li) such as silicon (Si) and tin (Sn) are highly anticipated.

These active materials such as Si and Sn have poor electron conductivity. When the electrical conductivity of the negative electrode is poor, the internal resistance of the electrode increases, which causes the cycle characteristics to be diminished. Therefore, it is typical to add a carbon material such as graphite or carbon black to the active material layer as a conductive material. However, it has become clear that even if a carbon material is used as a conductive material, the resistance will no longer decrease once a certain amount has been added.

In particular, when Si, Sn, or the like is used as an active material, it is difficult to favorably maintain the adhesive state between the current collector and the active material since these materials undergo large changes in volume in response to the absorption and release of Li at the time of charge and discharge. In addition, these materials have an extremely large volume change rate in response to the insertion and desorption of Li, and the active material particles are pulverized or desorbed as result of repeated expansion and contraction due to the charge-discharge cycle, which leads to the drawback that cycle deterioration is very large.

A copper foil disclosed in Patent Document 1 (Japanese Patent No. 4583149), which was developed for a flexible printed circuit board (FPC) to be laminated with a film (polymer material), can withstand the heat treatment at 180° C. for 1 hour required for lamination with a film and has high tensile strength.

However, such a copper foil for an FPC normally must be able to withstand heat treatment at 350° C. for 1 hour as a current collector for a battery. When the copper foil is exposed to such temperatures, the crystals become coarse, and the tensile strength cannot be maintained at 300 MPa or higher after heating, so the copper foil cannot be utilized as a current collector for a secondary battery. The reason for this is that an active material composition prepared in the form of a paste by adding a solvent or the like to a mixture of an active material, a conductive material, and a binder is applied to the surface of the current collector for a lithium-ion secondary battery, and a negative electrode of the lithium-ion secondary battery is formed via a drying process, but heat treatment at 350° C. for 1 hour is normally required for the drying process. When the copper foil for an FPC described above is used directly, the crystals of the copper foil become coarse, and the tensile strength after heating cannot be maintained at 300 MPa or higher. Therefore, the copper foil cannot withstand the expansion and contraction caused by the charge-discharge cycle of the active material, and there is a possibility that the copper foil may rupture as a result.

An active material using a pitch coke material is disclosed in Patent Document 2 (Japanese Unexamined Patent Application Publication No. 2004-079523A). It has become clear from research in recent years that the active material disclosed in this document undergoes smaller changes in volume in response to the absorption and release of Li at the time of charge and discharge than Si or Sn alloys. However, the surface roughness of the copper foil is very low, so the surface of the material is smooth. Therefore, when such a copper foil is applied to an active material using a pitch coke material, the changes in the volume of the copper foil in response to the absorption and release of Li at the time of charge and discharge are larger than those of the coke material, which may cause the detachment of the copper foil and the active material and the reduction of the contact area with the active material so that charging and discharging cannot be realized.

A copper foil disclosed in Patent Document 3 (Japanese Unexamined Patent Application Publication No. 2010-282959A) addresses this issue by roughening both sides of the copper foil in order to enhance the adhesiveness between the active material and the copper foil. The problem of the detachment of the active material and the copper foil can be solved by the roughening of the copper foil surface. However, no consideration is given to the difference in the degrees of roughness on the front and back sides of the copper foil. In particular, since an active material comprising a Si or Sn alloy has a very small particle size, it is not always possible to uniformly apply the active material to both the front and back sides. Therefore, the copper foil may deform and develop wrinkles as a result of expansion and contraction of the active material due to charging and discharging, which leads to the risk that the material may not be usable as a battery.

It is disclosed in Non-Patent Document 1 (Lakshmanan et al., "The effect of chloride ion in the electrowinning of copper", Journal of Applied Electrochemistry 7 (1977) 81-90) that the state of the surface of a copper foil is dependent on current density. That is, it is disclosed that, in the foil production process, a smooth surface is obtained by limiting the current density to a lower level at a chlorine ion concentration of 0 ppm.

In addition, Non-Patent Document 2 (Anderson et al., "Tensile properties of acid copper electrodeposits", Journal of Applied Electrochemistry 15 (1985) 631-637) discloses that, as disclosed in FIG. 7, although the initial maximum tensile strength is high when the chlorine ion concentration in a copper sulfate plating bath is 0 ppm, the elongation is low. When the chlorine ion concentration is 5 ppm, the initial maximum tensile strength decreases dramatically, and the elongation increases dramatically with inverse proportion to the maximum tensile strength. This suggests that when chlorine ions are added at a concentration of at least 10 ppm, the maximum tensile strength and the elongation rate demonstrate gradual changes with inverse proportion to one another.

With the techniques disclosed in the documents described above, it is possible to change the surface roughness by controlling the current density. In order to obtain an electrodeposited copper foil with elongation that is not diminished substantially even if the maximum tensile strength is increased, it is preferable to produce the foil with a chlorine ion concentration of at least 5 ppm, which can be read as a suggestion that it is preferable to produce the foil with a chlorine ion concentration of at least 10 ppm. However, these documents do not disclose the detailed techniques for obtaining a copper foil with a tensile strength of at least 300 MPa after heating at 350° C. for 1 hour and an elongation rate of at least 3.0% after heating at 350° C. for 1 hour.

PRIOR ART DOCUMENTS

Patent Documents

Patent Document 1: Japanese Patent No. 4583149B
Patent Document 2: Japanese Unexamined Patent Application Publication No. 2004-079523A
Patent Document 3: Japanese Unexamined Patent Application Publication No. 2010-282959A Non-Patent Documents

[Non-Patent Document 1] Lakshmanan et al., "The effect of chloride ion in the electrowinning of copper", Journal of Applied Electrochemistry 7 (1977) 81-90
[Non-Patent Document 2] Anderson et al., "Tensile properties of acid copper electrodeposits", Journal of Applied Electrochemistry 15 (1985) 631-637, FIG. 7

SUMMARY OF THE INVENTION

Problems to be Solved by the Invention

Charge-discharge cycle life and overcharge characteristics are important characteristics of a lithium-ion secondary battery, and there is a demand for further improvements in these characteristics.

The contact between the current collector (copper foil) and the active material becomes poor due to stress or the like caused by expansion and contraction with repeated charge and discharge, and the charge-discharge cycle life is the life up to the point when part of the active material assumes an electrical conductivity that is unusable for charging and discharging and thus causes the deterioration of the capacity.

Overcharge characteristics require that no cracks or fractures be generated due to the deterioration of the current collector (copper foil) over time when an overcharge is performed.

The electrodeposited copper foils described in Patent Documents 1 and 2, which have fine crystal structures and reduced surface roughness, are subjected to the detachment of the copper foil from Si or Sn alloy-based active materials, in particular, and cannot be considered to sufficiently meet the demands of the market from the perspective of the charge-discharge cycle life or the overcharge characteristics.

In addition, it is sometimes impossible to thickly and uniformly apply a slurry containing a Si or Sn alloy-based active material in order to produce a negative electrode for a battery, in particular, with a copper foil prepared so as to have a surface roughness Rz of from 1.5 to 20 μm by roughening the surface of the copper foil, and there is a risk of inducing fracture, wrinkling, deformation, and the like in the copper foil.

There is a demand for a copper foil having excellent elongation characteristics after heat treatment at 350° C. for 1 hour, in particular, as characteristics of the copper foil that affect the charge-discharge cycle life and overcharge characteristics.

Therefore, an object of the present invention is to provide an electrodeposited copper foil in which roughening treatment is performed on a glossy surface of a copper foil, both sides (S-surface and M-surface) of the copper foil having a surface area ratio (actual surface area/geometric surface area) of from 1.6 to 2.2, and the copper foil having a tensile strength of at least 300 MPa and an elongation rate of at least 3.0% after heat treatment at 350° C. for 1 hour. The technique of controlling the surface area ratio by roughening both sides of the electrodeposited copper foil is a known technique, but there is a drawback in that performing roughening treatment on a matte surface (rough surface) side causes the weight of the copper foil to increase and causes the energy density of the battery to decrease. Since the glossy surface of an electrodeposited copper foil is typically a replica of a titanium rotary drum used for a cathode, the surface is smooth and has poor adhesiveness with the active material when roughening treatment is not performed. However, the surface roughness and surface shape of a matte surface (rough surface) are determined by the additives of the electrolyte. A characteristic of the surface of the present invention is to eliminate the need for the roughening treatment of the matte surface side by controlling the additive components, the concentration, and the solution temperature of the electrolyte, and the current density so as to control the surface area, Sm, Rz, and Ra of the matte surface (rough surface) and to provide a copper foil with excellent battery characteristics by performing roughening treatment on only the S-surface side.

Another object of the present invention is to provide a copper foil which prevents the breakage of a current collector (copper foil) while maintaining adhesiveness between the current collector (copper foil) and the active material in response to substantial expansion and contraction of a Si or Sn alloy-based active material. Another object of the present invention is to provide a lithium-ion secondary battery using the electrodeposited copper foil as a current collector.

Means to Solve the Problem

The electrodeposited copper foil of the present invention is an electrodeposited copper foil having a roughened glossy surface, the tensile strength of the copper foil being at least 300 MPa after heating at 350° C. for 1 hour, the elongation rate being at least 3.0% after heating at 350° C. for 1 hour, and the respective surface area ratios (actual surface area/ geometric surface area) of both sides (M-surface and S-surface) of the copper foil being from 1.6 to 2.2.

The electrodeposited copper foil of the present invention preferably has a tensile strength of at least 500 MPa in the normal state (normal temperature and normal pressure state).

The lithium-ion secondary battery of the present invention is characterized in that the negative electrode current collector constituting the lithium-ion secondary battery is the electrodeposited copper foil of the present invention described above.

The production method for the electrodeposited copper foil of the present invention is a production method for an electrodeposited copper foil having a tensile strength of at least 300 MPa after heating at 350° C. for 1 hour and elongation of at least 3.0% after heating at 350° C. for 1 hour, the electrolyte for producing the electrodeposited copper foil being a copper sulfate-based electrolyte containing from 1 to 20 ppm of organic additives of one or more compounds selected from compounds having a structure with an SH group binding to a heterocycle containing N or thiourea-based compounds, and from 10 to 80 ppm of chlorine ions.

Effects of the Invention

The present invention can provide an electrodeposited copper foil having a tensile strength of at least 300 MPa and elongation of at least 3.0% after heat treatment at 350° C. for 1 hour. As a result, it is possible to provide an electrodeposited copper foil which prevents the breakage of a current collector (copper foil) while maintaining adhesiveness between the current collector (copper foil) and the active material in response to substantial expansion and contraction of a Si or Sn alloy-based active material.

In addition, the present invention can provide an excellent lithium-ion secondary battery by using the electrodeposited copper foil as a negative electrode current collector.

BRIEF DESCRIPTION OF THE DRAWING

FIG. 1 is a partial front view for explaining a lithium-ion secondary battery.

BEST MODE FOR CARRYING OUT THE INVENTION

As illustrated in FIG. 1, a non-aqueous electrolyte secondary battery such as a lithium-ion secondary battery, for example, comprises a positive electrode 3 formed by applying a positive electrode active material 2 to a positive electrode current collector 1 and a negative electrode 6 formed by applying a negative electrode active material 5 to a negative electrode current collector 4.

This lithium-ion secondary battery is produced by sequentially laminating the positive electrode 3, a separator 7, the negative electrode 6, and a separator 7 to form a laminated electrode body and housing the battery in a battery can 10 in a state with insulators 8 and 9 disposed above and below a spiral-shaped electrode body formed by winding this laminated electrode body multiple times.

The negative electrode 6 constituting the lithium-ion secondary battery is formed by applying an active material 5 to the current collector 4 made of copper foil and drying the material.

The electrodeposited copper foil for the electrode current collector 4 of the present invention is an electrodeposited copper foil having a tensile strength of at least 300 MPa after heating at 350° C. for 1 hour and an elongation rate of at least 3.0% after heating at 350° C. for 1 hour.

As described above, the electrodeposited copper foil constituting the negative electrode current collector 4 of the lithium-ion secondary battery normally must be able to withstand heat treatment at 350° C. for 1 hour. That is, an active material composition prepared in the form of a paste by adding a solvent or the like to a mixture of an active material, a conductive material, and a binder is applied to the surface of the negative electrode current collector 6 for the lithium-ion secondary battery, and the negative electrode 6 of the lithium-ion secondary battery is formed via a drying process, but heat treatment at 350° C. for 1 hour is normally required for the drying process. As a copper foil capable of withstanding the heating conditions of this drying process and resistant to expansion and contraction due to the charge-discharge cycle of the active material, an electrodeposited copper foil having a tensile strength of at least 300 MPa and preferably at least 500 MPa and an elongation rate of at least 3.0% after heating at 350° C. for 1 hour must be used.

It is preferable to perform roughening treatment only on the glossy surface of the electrodeposited copper foil and to regulate the Sm (average spacing of waves) of both surfaces (S-surface and M-surface) to the range of from 16 μm to 28 μm. In addition, the respective surface area ratios (actual surface area/geometric surface area) of both sides of the copper foil are from 1.6 to 2.2.

An electrodeposited copper foil satisfying the conditions described above is produced as follows.

Specifically, in the production method for an electrodeposited copper foil having a tensile strength of at least 300 MPa after heating at 350° C. for 1 hour and elongation of at least 3.0% after heating at 350° C. for 1 hour, the electrolyte for producing the electrodeposited copper foil is a copper sulfate-based electrolyte containing from 3 to 20 ppm of organic additives of one or more compounds selected from compounds having a structure with an SH group binding to a heterocycle containing N or thiourea-based compounds, from 0 to 12 ppm of hydroxyethyl cellulose or a low-molecular weight glue, and from 10 to 80 ppm of chlorine ions.

The reason that the amount of the organic additives added to the electrolyte is from 3 to 20 ppm is that the target values of the initial strength and the strength after heating the copper foil cannot be achieved at less than 3 ppm. Although the strength of the copper foil improves dramatically when the amount of the organic additives is greater than or equal to 20 ppm, the foil becomes brittle and the elongation is at most 3.0%, which is not preferable. Therefore, the amount is set to the range of from 3 to 20 ppm.

It is preferable to add from 0 to 12 ppm of hydroxyethyl cellulose (HEC) or a low-molecular weight glue (PBF) to the electrolyte containing from 3 to 20 ppm of organic additives of one or more compounds selected from compounds having a structure with an SH group binding to a heterocycle containing N or thiourea-based compounds. The strength after heating at 350° C. for 1 hour improves dramatically as a result of adding hydroxyethyl cellulose or a low-molecular weight glue. That is, when sufficient strength after heating cannot be achieved with the organic additives alone, a copper foil having a strength exceeding 400 MPa after heating at 350° C. for 1 hour can be obtained by adding hydroxyethyl cellulose or a low-molecular weight glue.

When the added amount of HEC or PBF exceeds 12 ppm, the elongation of the copper foil after heating at 350° C. for 1 hour is at most 3.0%, which is not preferable, so the added amount is set to the range of from 0 to 12 ppm. Of course, the same effect can be achieved by adding HEC and PBF in combination.

The amount of chlorine added to the electrolyte is from 10 to 80 ppm. According to the content disclosed in Non-Patent Document 2 (paper of Anderson), it is disclosed that when the amount of chlorine ions is at least 10 ppm, the maximum tensile strength decreases and the elongation gradually increases in step with increases in the amount of chlorine ions added. In the working examples and comparative examples described below, the amounts of chlorine added were at most 10 ppm, 30 ppm, and 80 ppm. When the amount of chlorine ions is less than 10 ppm, the tensile strength is at most 300 MPa after heating at 350° C. for 1 hour. When 80 ppm of chlorine ions are added, the surface roughness increases and the battery characteristics after 100 cycles tend to be diminished, but the range up to 80 ppm was not problematic for use as a copper foil for a battery. Accordingly, it is preferable to add chlorine ions at an amount of from 10 to 80 ppm and more preferably in an amount that does not exceed 80 ppm.

Using the copper sulfate solution shown in Working Example 1 as an electrolyte, the electrodeposited copper foil is produced by performing electrolysis under conditions with a current density of from 40 to 55 A/dm$^2$ and a solution temperature of from 45 to 60° C. using titanium coated with a noble metal oxide as an anode and using a titanium rotary drum as a cathode.

In an embodiment of the present invention, the S-surface is subjected to roughening treatment. The conditions of the roughening treatment performed on the S-surface are such that the surface roughness of the S-surface after roughening is similar to the surface roughness of the M-surface. For example, the surface roughness (Rz), (Sm), and the surface area ratio can be improved to the same surface state as that of the M-surface by subjecting the S-surface to roughening treatment under conditions with a current density of from 40 to 55 A/dm$^2$ and a bath temperature of from 45 to 60° C.

EXAMPLES

The present invention will be described in detail hereinafter with reference to working examples.

Working Examples 1 to 15 and Comparative Examples 1 to 6

A titanium drum was placed in an electrolyte with a composition prepared by adding one or more compounds selected from compounds having a structure with an SH group binding to a heterocycle containing N and thiourea-based compounds in an amount shown in Table 1 and hydroxyethyl cellulose (HEC) or a low-molecular weight glue (PBF) to the copper sulfate electrolytic bath described below, and an electrodeposited copper foil was formed under the electrolysis conditions described below.

Copper sulfate electrolytic bath composition;

| Copper (Cu) | 70 g/L |
| Sulfuric acid (H$_2$SO$_4$) | 50 g/L |
| Chlorine ion | 30 ppm |

Electrolysis conditions;

| Current density | 40 A/dm$^2$ |
| Temperature | 45° C. |

TABLE 1

| Solution temperature (° C.) | 45 | Current density (A/dm2) | 40 | | |
| Sulfuric acid (g/L) | 50 | Copper (g/L) | 70 | Chlorine (ppm) | 30 |

| | | | | | | | Initial | | After heating at 350° C. for 1 hour | | |
| Working Example No. | (ppm) Ethylene thiourea | (ppm) Thiourea | (ppm) Tetramethyl-thiourea | (ppm) N,N-Diethyl thiourea | (ppm) HEC | (ppm) PBF | Tensile strength MPa | Elongation rate (%) | Tensile strength MPa | Elongation rate (%) | Foil No. before roughening |
|---|---|---|---|---|---|---|---|---|---|---|---|
| Working Example 1 | 3 | 0 | 0 | 0 | 4 | 0 | 703 | 2.8 | 392 | 6.2 | A |
| Working Example 2 | 3 | 0 | 0 | 0 | 6 | 6 | 658 | 2.6 | 363 | 8.0 | B |
| Working Example 3 | 3 | 0 | 0 | 0 | 8 | 0 | 715 | 2.5 | 368 | 4.4 | C |
| Working Example 4 | 3 | 0 | 0 | 0 | 2 | 12 | 738 | 3.2 | 394 | 4.9 | D |
| Working Example 5 | 5 | 0 | 0 | 0 | 0 | 0.5 | 722 | 2.3 | 305 | 10.4 | E |
| Working Example 6 | 5 | 0 | 0 | 0 | 0 | 4 | 723 | 2.2 | 346 | 7.7 | F |
| Working Example 7 | 5 | 0 | 0 | 0 | 0 | 8 | 765 | 2.4 | 421 | 3.2 | G |
| Working Example 8 | 5 | 0 | 0 | 0 | 12 | 0 | 765 | 2.4 | 400 | 3.3 | H |
| Working Example 9 | 0 | 3 | 0 | 0 | 12 | 0 | 505 | 4.5 | 300 | 6.8 | I |
| Working Example 10 | 0 | 6 | 0 | 0 | 0 | 0 | 730 | 2.2 | 310 | 6.3 | J |
| Working Example 11 | 0 | 20 | 0 | 0 | 0 | 0 | 800 | 2.4 | 420 | 3.5 | K |
| Working Example 12 | 0 | 0 | 6 | 0 | 0 | 0 | 660 | 3.1 | 480 | 4.6 | L |
| Working Example 13 | 0 | 0 | 0 | 9 | 0 | 6 | 690 | 2.5 | 350 | 3.5 | M |
| Working Example 14 | 0 | 0 | 0 | 18 | 0 | 0 | 750 | 3.3 | 440 | 4.2 | N |
| Working Example 15 | 3 | 3 | 3 | 3 | 0 | 0 | 780 | 4.1 | 500 | 5.5 | O |
| Comparative Example 1 | 0.5 | 0 | 0 | 0 | 16 | 0 | 400 | 2.4 | 280 | 3.6 | P |
| Comparative Example 2 | 2 | 0 | 0 | 0 | 0 | 0 | 500 | 2.0 | 250 | 3.5 | Q |
| Comparative Example 3 | 0 | 22 | 0 | 0 | 0 | 0 | 800 | 1.3 | 420 | 1.3 | R |

TABLE 1-continued

| | | | | | | | | | | | |
|---|---|---|---|---|---|---|---|---|---|---|---|
| Comparative Example 4 | 0 | 0 | 21 | 0 | 5 | 0 | Foil not produced | Foil not produced | Foil not produced | Foil not produced | S |
| Comparative Example 5 | 0 | 0 | 2 | 0 | 0 | 0 | 440 | 1.9 | 270 | 6.3 | T |
| Comparative Example 6 | 0 | 0 | 2 | 0 | 14 | 0 | 460 | 1.9 | 397 | 2.0 | U |

Next, only the S-surface of the drum side was subjected to roughening plating. The roughening plating conditions are as follows. Roughening treatment:

(A) Burnt plating in roughening treatment:

In an electrolyte primarily comprising 30 g/dm$^3$ of copper and 150 g/dm$^3$ of sulfuric acid, cathodic electrolysis was performed under conditions for obtaining a predetermined prescribed surface shape by appropriately selecting the electrolysis time within a current density range of from 10 to 20 A/dm$^2$ in an electrolytic bath containing from 0.1 to 2000 mg/L of metal elements such as Mo, Fe, Ni, Co, Ti, Bi, and W, as shown in Table 2, without heating.

TABLE 2

| Roughening conditions | | | | | | | |
|---|---|---|---|---|---|---|---|
| Roughening conditions | Mo | Fe | Ni | Co | Ti | Bi | W |
| a | 300 | 2000 | 0 | 0 | 0 | 0 | 0.1 |
| b | 200 | 0 | 10 | 2000 | 0 | 0 | 0 |
| c | 0 | 0 | 0 | 0 | 1000 | 0 | 0 |
| d | 0 | 0 | 0 | 0 | 0 | 500 | 0 |
| e | 0 | 0 | 0 | 0 | 0 | 0 | 200 |
| f | 0 | 0 | 0 | 0 | 0 | 0 | 0 |

(Metal Concentration in Solution (mg/L))

The reason that the glossy surface is subjected to burnt plating in the electrolytic bath containing the metal elements described above is to prevent the dropout of roughened particles by making the roughened particles uniform, to prevent decreases in the strength of the roughened particles after heating by performing burnt plating in the electrolytic bath containing the metal elements described above, and to reduce the difference in hardness relative to that of the untreated deposited surface (matte surface).

(B) Smooth copper plating (capsule plating) in roughening treatment:

In an electrolyte primarily comprising 70 g/dm$^3$ of copper and 100 g/dm$^3$ of sulfuric acid and maintained at a solution temperature of 40° C., cathodic electrolysis was performed under conditions in which the electrolysis time for obtaining a prescribed surface shape determined together with the preceding conditions of (A) were selected appropriately within a current density range of from 5 to 10 A/dm$^2$.

When using the electrodeposited copper foil of the present invention as a current collector for a battery, it is preferable to control the particle size of the roughened particles after the roughening treatment of (A) and (B) to within the range of from approximately 0.1 to 2.0 μm. This is, when the particle size is smaller than 0.1 μm, the anchor effect with the active material weakens, and the resulting cycle characteristics of the battery are poor. Conversely, when the particle size of the roughened particles exceeds 2.0 μm, the active material does not penetrate deeply into the roughened particles, and voids are generated at the interface of the copper foil and the interface of the active material, which tends to diminish the cycle characteristics of the battery. Therefore, the particle size of the roughened particles is preferably within the range of from 0.1 to 2.0 μm.

The thickness of the roughened particle layer to be deposited on the glossy surface side is preferably from 0.3 to 2.0 μm. This is, when the thickness is less than 0.3 μm, it is difficult to control the surface area by roughening, whereas even if the thickness exceeds 2.0 μm, practically no difference is observed in the effects of roughening. Conversely, the energy density per unit weight of the battery decreases when the weight of the roughened particles increases.

Electrodeposited copper foils produced and subjected to roughening treatment as described above were subjected to rust proofing under the following conditions.

An untreated electrodeposited copper foil was immersed for 5 seconds in an aqueous solution of CrO$_3$ (1 g/L) and subjected to chromate treatment. The foil was then washed with water and dried.

Here, although chromate treatment was performed, it goes without saying that benzotriazole treatment, silane coupling agent treatment, or chromate treatment followed by silane coupling agent treatment may also be performed.

Working Examples 16 and 17, and Comparative Examples 7 and 8

Electrodeposited copper foils were produced with the electrolyte compositions and electrolysis conditions shown in Table 3.

The untreated copper foils formed as described above were subjected to the same surface treatment as in Working Example 1.

TABLE 3

| Cu (g/L) | 80 | Current density (A/dm2) | 55 |
|---|---|---|---|
| H$_2$SO$_4$ (g/L) | 140 | Solution temperature (° C.) | 50 |

| | | | | | Room temperature | | After heating at 350° C. for 1 hour | | |
|---|---|---|---|---|---|---|---|---|---|
| Experiment No. | Chlorine (ppm) | PBF (ppm) | ETU (ppm) | HEC (ppm) | Tensile strength (MPa) | Elongation rate (%) | Tensile strength (MPa) | Elongation rate (%) | Electrode No. |
| Working Example 16 | 10 | 0 | 5 | 4 | 725 | 3.7 | 362 | 6.2 | V |
| Working Example 17 | 80 | 0 | 5 | 4 | 699 | 2.6 | 387 | 8.5 | W |

TABLE 3-continued

| | | | | | | | | | |
|---|---|---|---|---|---|---|---|---|---|
| Comparative Example 7 | 0 | 0.6 | 3 | 0 | 549 | 6.9 | 208 | 20.5 | X |
| Comparative Example 8 | 5 | 0.6 | 5 | 0 | 531 | 6.4 | 278 | 10.8 | Y |

The glossy surface (S-surface) of the electrodeposited copper foil obtained in each working example and comparative example was subjected to roughening treatment under the roughening treatment conditions of the combinations shown in Tables 2 and 4, and the surface area and Sm of the roughened surface and the surface roughness Rz, Ra, Ry, and Sm of the matte surface were measured. In addition, the respective surface area ratios of the S-surface and the M-surface with respect to the geometric surfaces were calculated. These measurements were performed, for example, by observing a 50×50 μm (2500 μm$^2$) field of view of a laser microscope (Keyence, VK-8700/9700), and the surface area ratio was defined as 1 for a measurement result of 2500 μm$^2$. These results and the charge and discharge efficiency are shown in Table 4.

As is clear from Tables 1 and 3, the added amounts of one or more compounds selected from compounds having a structure with an SH group binding to a heterocycle containing N or thiourea-based compounds in the electrolyte were within the range of from 1 to 20 ppm, so the tensile strengths of the resulting electrodeposited copper foils that were produced were at least 300 MPa, the elongation rates were at least 3%, and cleared the expected values.

On the other hand, in Comparative Examples 1 to 6, the added amounts of one or more compounds selected from compounds having a structure with an SH group binding to a heterocycle containing N or thiourea-based compounds in the electrolyte were outside the range of from 3 to 20 ppm, so the elongation rates were at most 3%, and could not clear the expected value.

TABLE 4

Battery characteristics

| Foil No. | Roughening before roughening | Roughened condition No. | Average thickness (μm) | Average particle size (μm) | S-surface Surface area ratio | S-surface Sm | M-surface Surface area ratio | M-surface Sm | M-surface roughness Rz (μm) | M-surface roughness Ra (μm) | M-surface roughness Ry (μm) | Charge and discharge efficiency |
|---|---|---|---|---|---|---|---|---|---|---|---|---|
| Working Example 1 | A | a | 2.0 | 2.0 | 2.2 | 19 | 1.8 | 19 | 3.2 | 0.7 | 5.2 | o |
| Working Example 2 | A | b | 1.6 | 0.5 | 2.1 | 16 | 1.8 | 19 | 3.2 | 0.7 | 5.2 | o |
| Working Example 3 | A | c | 0.3 | 0.1 | 1.6 | 22 | 1.8 | 19 | 3.2 | 0.7 | 5.2 | o |
| Working Example 4 | A | d | 0.9 | 0.3 | 1.8 | 18 | 1.8 | 19 | 3.2 | 0.7 | 5.2 | o |
| Working Example 5 | A | e | 0.4 | 0.2 | 1.9 | 16 | 1.8 | 19 | 3.2 | 0.7 | 5.2 | o |
| Working Example 6 | J | a | 0.3 | 0.3 | 1.8 | 19 | 1.6 | 28 | 1.4 | 0.3 | 3.2 | o |
| Working Example 7 | L | a | 1.3 | 0.5 | 1.9 | 19 | 1.7 | 27 | 1.9 | 0.4 | 3.6 | o |
| Working Example 8 | N | a | 1.2 | 0.4 | 1.7 | 19 | 2.2 | 16 | 3.4 | 0.8 | 2.6 | o |
| Working Example 9 | O | a | 0.4 | 0.2 | 2.2 | 18 | 1.6 | 20 | 1.2 | 0.3 | 1.9 | o |
| Working Example 10 | W | a | 1.8 | 1.3 | 1.6 | 22 | 2.1 | 16 | 1.6 | 0.4 | 2.6 | o |
| Comparative Example 1 | Q | a | 2 | 2.2 | 2.4 | 19 | 1.5 | 14 | 4.2 | 0.7 | 5.6 | x |
| Comparative Example 2 | R | a | 0.2 | 0.08 | 1.5 | 20 | 1.5 | 30 | 1.0 | 0.2 | 2.5 | x |
| Comparative Example 3 | U | a | 2.1 | 2.1 | 2.3 | 19 | 2.6 | 29 | 3.5 | 0.7 | 5.1 | x |
| Comparative Example 4 | A | a | 0.2 | 0.05 | 1.5 | 19 | 1.8 | 19 | 3.2 | 0.7 | 5.2 | x |
| Comparative Example 5 | A | a | 2.2 | 0.6 | 2.4 | 19 | 1.8 | 19 | 3.2 | 0.7 | 5.2 | x |
| Comparative Example 6 | A | f | 1.8 | 1.5 | 2.6 | 26 | 1.8 | 19 | 3.2 | 0.7 | 5.2 | x |

The initial tensile strength and initial elongation rate immediately after the production of each working example and comparative example were measured. In addition, the tensile strength and elongation rate were measured after heat treatment at 350° C. for 1 hour. The measurement results are shown in Table 1. Measurements were made based on the IPC-TM-650.

In addition, 30 ppm of chlorine ions were added in each of the working examples. However, it was demonstrated from the measurement results of this working example that the effects of the added organic additives are greater than the adverse effects that adding chlorine has on the characteristics of the copper foil.

That is, in these results, when from 3 to 20 ppm of organic additives of one or more compounds selected from compounds having a structure with an SH group binding to a heterocycle containing N or thiourea-based compounds and from 0 to 12 ppm of hydroxyethyl cellulose or a low-molecular weight glue were added to the copper sulfate-based electrolyte, the tensile strength was at least 300 MPa after heating at 350° C. for 1 hour, and the elongation rate was at least 3.0% after heating at 350° C. for 1 hour, indicating that the adverse effects that adding chlorine ions has on the copper foil are negated by the addition of the organic additives.

Negative electrodes for lithium-ion secondary batteries using, as current collectors, the copper foils prepared in each of the working examples and comparative examples were produced as follows.

An Si alloy-based active material (average particle size of from 0.1 to 10 μm) was used in powder form. At this time, a negative electrode mixture was prepared at a ratio of 90 wt. % Si alloy-based active material and 10 wt. % polyimide-based binder as a binding material. Next, this negative electrode mixture was dispersed in N-methylpyrrolidone serving as a solvent to form a slurry. This slurry was then applied to both sides of a strip of electrodeposited copper foil with a thickness of 12 μm prepared in each working example and comparative example and then compression-molded with a roller press after drying to form a strip-shaped negative electrode. This strip-shaped negative electrode was formed so that the film thickness of the negative electrode mixture after molding was the same at 90 μm on both sides and so that the width and length were 55.6 mm and 551.5 mm, respectively.

Next, the positive electrode 3 was prepared as follows. The positive electrode active material ($LiCoO_2$) was obtained by mixing 0.5 mol of lithium carbonate and 1 mol of cobalt carbonate, and calcining the mixture for 5 hours at 900° C. in air.

A positive electrode mixture mixed at a ratio of 91 wt. % of this positive electrode active material ($LiCoO_2$), 6 wt. % graphite as a conductive agent, and 3 wt. % polyvinylidene fluoride as a binding agent was dispersed in N-methyl-2-pyrrolidone to form a slurry. Next, this slurry was applied uniformly to both sides of a positive electrode current collector 1 made of a strip of aluminum with a thickness of 20 μm and then compression-molded with a roller press after drying to obtain a strip-shaped positive electrode with a thickness of 160 μm. This strip-shaped positive electrode was formed so that the film thickness of the positive electrode mixture after molding was 70 μm on both surfaces and so that the width and length were 53.6 mm and 523.5 mm, respectively.

A laminated electrode body was formed by laminating the strip-shaped positive electrode, the strip-shaped negative electrode prepared in this way, and a separator 7 made of a microporous polypropylene film with a thickness of 25 μm and a width of 58.1 mm. This laminated electrode body was wound many times into a spiral shape along the length direction thereof with the negative electrode 6 on the inside, and the final end parts of the outermost separator were fixed with tape to form a spiral-shaped electrode body. The hollow portion of this spiral-shaped electrode body was formed with an inner diameter of 3.5 mm and an outer shape of 17 mm.

The spiral-shaped electrode body prepared as described above was housed in a nickel-plated iron battery can in a state where insulating plates are installed on both the upper and lower surfaces. In order to enable the current collection of the positive and negative electrodes, a positive electrode lead 13 made of aluminum was drawn from the positive electrode current collector 1 and connected to a battery cover 11, and a negative lead made of nickel was drawn from the negative electrode current collector 4 and connected to the battery can.

Next, 5.0 g of a non-aqueous electrolyte prepared by dissolving $LiPF6$ at a ratio of 1 mol/L in a solvent prepared by mixing equal volumes of propylene carbonate and diethyl carbonate was injected into the battery can in which this spiral-shaped electrode body was housed. Next, the battery cover 11 was fixed by caulking the battery can via an insulating sealing gasket 12 coated with an asphalt surface so as to maintain the airtightness inside the battery can.

As described above, a cylindrical non-aqueous electrolyte (lithium-ion) secondary battery with a diameter of 18 mm and a height of 65 mm was prepared, and an evaluation of the negative electrode of this non-aqueous electrolyte (lithium-ion) secondary battery was performed at a temperature of 25° C. with the following method.

Charge and discharge test (evaluation of the adhesion of the active material and the current collector)
Initial Conditions
Charging: Constant current charging at a current equivalent to 0.1 C, after achievement of 0.02 V (opposite Li/Li+), constant voltage charging, terminating when the charging current is 0.05 C equivalent or less.
Discharging: Constant current discharging at a current equivalent to 0.1 C, terminating at 1.5 V.
Charge-discharge Cycle Conditions
After the initial charge and discharge tests were carried out, charge-discharge cycles were repeated for 100 cycles at the same 0.1 C equivalent current.

For electrodes using this electrodeposited copper foil as a negative electrode current collector material, a discharge capacity retention rate of 30% or higher after 100 charge-discharge cycles was considered passing and denoted with a ○, and other cases were considered unacceptable and denoted with an x. The results are shown in Table 1.

The discharge capacity retention rate after 100 cycles is expressed by the following formula.

$$\text{(Discharge capacity retention rate (\%) after 100 cycles)} = [(\text{discharge capacity after 100 cycles})/(\text{maximum discharge capacity})] \times 100$$

As is clear from Table 1, in Working Examples 1 to 15, electrodeposited copper foils having a tensile strength of at least 300 MPa after heating at 350° C. for 1 hour and elongation of at least 3.0% after heating at 350° C. for 1 hour were produced by adding from 3 to 20 ppm of one or more compounds selected from compounds having a structure with an SH group binding to a heterocycle containing N or thiourea-based compounds, from 0 to 12 ppm of hydroxyethyl cellulose or a low-molecular weight glue, and 30 ppm of chlorine ions to the copper sulfate-based electrolyte for producing the electrodeposited copper foil. The lithium ion secondary batteries using these copper foils as current collectors exhibited excellent performance.

On the other hand, in Comparative Examples 1 to 6, the added amounts of one or more compounds selected from compounds having a structure with an SH group binding to a heterocycle containing N or thiourea-based compounds in the electrolyte were outside the range of from 3 to 20 ppm, so the elongation rates were at most 3% and could not clear the expected value.

As described above, Comparative Examples 1 to 6 were not able to clear the expected values of tensile strength and elongation after heating and therefore did not demonstrate satisfactory results as a current collector for a lithium-ion secondary battery.

Although the added amount of chlorine ions affects the characteristics of the copper foil, it was demonstrated that the effects of the organic additives are even greater. The present invention successfully provided an electrodeposited copper foil that is particularly preferable as a current collector for a lithium-ion secondary battery having a tensile strength of at least 300 MPa after heating at 350° C. for 1 hour or an elongation rate of at least 3.0% after heating at 350° C. for 1 hour by adding from 3 to 20 ppm of one or more compounds, as organic additives, selected from compounds having a structure with an SH group binding to a heterocycle containing N or thiourea-based compounds and from 0 to 12 ppm of hydroxyethyl cellulose or a low-molecular weight glue to a copper sulfate-based electrolyte.

In addition, the same evaluations were performed after substituting Sn for the active material Si described above. The results confirmed that the battery had the same performance as a lithium-ion secondary battery using the active material Si.

REFERENCE NUMERALS

1: positive electrode current collector
2: positive electrode active material
3: positive electrode
4: negative electrode current collector
5: negative electrode active material
6: negative electrode
7: separator
8, 9: insulators
10: battery can
11: battery cover
12: gasket
13: positive electrode lead

What is claimed is:

1. An electrodeposited copper foil for a non-aqueous electrolyte secondary battery, comprising:
   a matte surface on which a roughening treatment is not performed; and
   a glossy surface on which the roughening treatment is performed,
   wherein a tensile strength of the electrodeposited copper foil is at least 300 MPa after heating at 350° C. for 1 hour,
   an elongation rate of the electrodeposited copper foil is at least 3.0% after heating at 350° C. for 1 hour, and
   respective surface area ratios (actual surface area/geometric surface area) of both sides of the electrodeposited copper foil are from 1.6 to 2.2.

2. The electrodeposited copper foil according to claim 1, wherein a tensile strength of the electrodeposited copper foil in a room temperature and an atmospheric pressure state is at least 500 MPa.

3. The electrodeposited copper foil according to claim 1 or 2, wherein an average particle size of roughened particles of the glossy surface is from 0.1 to 2.0 μm.

4. The electrodeposited copper foil according to claim 1 or 2, wherein a thickness of a roughened layer of the glossy surface is from 0.3 to 2 μm.

5. A lithium-ion secondary battery comprising, a positive electrode and a negative electrode,
   wherein said lithium-ion secondary battery includes a negative electrode current collector formed of the electrodeposited copper foil described in claim 3, and
   said negative electrode further includes an active material layer formed of a mixture of an Si alloy in a powder for and a binding material, and produced by applying a slurry including a mixture of an Si alloy-based active material, the binding material, and a solvent on the negative current collector, drying and compression-molding.

6. A lithium-ion secondary battery comprising a positive electrode and a negative electrode,
   wherein said negative electrode includes a negative electrode current collector formed of the electrodeposited copper foil described in claim 4, and
   said negative electrode further includes an active material layer formed of a mixture of an Si alloy in a powder form and a binding material, and produced by applying a slurry including a mixture of an Si alloy-based active material, the binding material, and a solvent on the negative current collector, drying and compression-molding.

7. A lithium-ion secondary battery comprising,
   a positive electrode; and
   a negative electrode,
   wherein said positive electrode includes a positive current collector and a first active material layer formed on the positive current collector,
   said negative electrode includes a negative current collector and a second active material layer formed on the negative current collector,
   said negative electrode current collector is formed of an electrodeposited copper foil,
   said electrodeposited copper foil includes a matte surface on which a roughening treatment is not performed, and a glossy surface on which the roughening treatment is performed,
   a tensile strength of the electrodeposited copper foil is at least 300 MPa after heating at 350° C. for 1 hour,
   an elongation rate of the electrodeposited copper foil is at least 3.0% after heating at 350° C. for 1 hour,
   respective surface area ratios (actual surface area/geometric surface area) of both sides of the electrodeposited copper foil are from 1.6 to 2.2, and
   said second active material layer is formed of a mixture of an Si alloy in a powder form and a binding material, and produced by applying a slurry including a mixture of an Si alloy-based active material, the binding material, and a solvent on the negative current collector, drying and compression-molding.

8. A lithium-ion secondary battery comprising,
   a positive electrode; and
   a negative electrode,
   wherein said positive electrode includes a positive current collector and a first active material layer formed on the positive current collector,
   said negative electrode includes a negative current collector and a second active material layer formed on the negative current collector,
   said negative electrode current collector is formed of an electrodeposited copper foil,
   said electrodeposited copper foil includes a matte surface on which a roughening treatment is not performed, and a glossy surface on which the roughening treatment is performed,
   a tensile strength of the electrodeposited copper foil is at least 300 MPa after heating at 350° C. for 1 hour,
   an elongation rate of the electrodeposited copper foil is at least 3.0% after heating at 350° C. for 1 hour, respective surface area ratios (actual surface area/geometric surface area) of both sides of the electrodeposited copper foil are from 1.6 to 2.2, a tensile strength of the electrodeposited copper foil in a room temperature and an atmospheric pressure state is at least 500 MPa, and said second active material layer is formed of a mixture of an Si alloy in a powder form and a binding material, and produced by applying a slurry including a mixture of an Si alloy-based active material, the binding material, and a solvent on the negative current collector, drying and compression-molding.

9. The lithium-ion secondary battery according to claim 7 or 8, wherein an average particle size of roughened particles of the glossy surface is from 0.1 to 2.0 μm, and a thickness of a roughened layer of the glossy surface is from 0.3 to 2 μm.

* * * * *